United States Patent [19]

Behr et al.

[11] 4,006,120
[45] Feb. 1, 1977

[54] THERMOSTABLE POLYESTER

[75] Inventors: Erich Behr, Troisdorf; Wolfgang Wolfes, Bergheim, Sieg, both of Germany

[73] Assignee: Dynamit Nobel Aktiengesellschaft, Troisdorf, Germany

[22] Filed: June 5, 1974

[21] Appl. No.: 476,761

Related U.S. Application Data

[63] Continuation-in-part of Ser. No. 244,239, April 14, 1972, abandoned, which is a continuation of Ser. No. 33,968, May 1, 1970, abandoned.

[30] Foreign Application Priority Data

May 27, 1969 Germany .......................... 1926843

[52] U.S. Cl. .......................... 260/47 C; 260/33.8 R
[51] Int. Cl.$^2$ ........................................ C08G 63/18
[58] Field of Search .......................... 260/47 C

[56] References Cited

UNITED STATES PATENTS

| | | | |
|---|---|---|---|
| 2,858,342 | 10/1958 | Bender et al. | 260/619 |
| 3,128,264 | 4/1964 | Laakso et al. | 260/47 C X |
| 3,133,898 | 5/1964 | Keck | 260/47 C |
| 3,216,970 | 11/1965 | Conix | 260/47 C |
| 3,351,624 | 11/1967 | Conix | 260/47 C |
| 3,673,153 | 6/1972 | Behr | 260/47 C |

OTHER PUBLICATIONS

Ind. and Eng. Chem., Conix, vol. 51, No. 2, Feb., 1969, pp. 147–150.
Izv. Akad. Nauksssr, Ser. Khim, 1964(1), pp. 141–148, Korshak et al.
Chem. Abstracts, vol. 52, 1958, 20028f–20028h, Korshak et al.
Dokl. Akad. Nauksssr, 156(4), pp. 880–883 (1964), Korshak et al.
Chem. Abstracts, vol. 61, 1964, 8419a–8419b, Korshak et al.
Chem. Abstracts, vol. 74, 1971, 4033p, Behr–Date 10/1/70.
Chem. Abstracts, vol. 60, 1964, 14620a–14630b Korshak et al.
Chem. Abstracts, vol. 64, 1966, 6766e–6766f, Korshak et al.

Primary Examiner—Howard E. Schain
Attorney, Agent, or Firm—Burgess, Dinklage & Sprung

[57] ABSTRACT

A process for the preparation of a thermostable polyester which is insoluble in tetrachloroethane and consists of about 40 to 200 units, said polyester having units of the formula

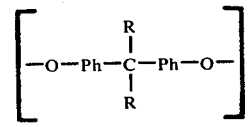

combined with units of the formula

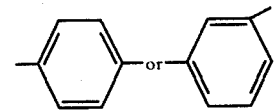

wherein Ph is

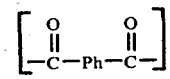

and both R radicals are methyl on some units and both R radicals are phenyl on the balance of the units, said methyl units comprising 5–30 mole percent of the total R-containing units which comprises heating and condensing in the absence of a catalyst 4,4′-dihydroxytetraphenylmethane having a melting point of at least 295° C together with 2,2-bis-(4-hydroxyphenyl)-propane and terephthalic or isophthalic acid dichloride until there is prepared said polyester which is insoluble in tetrachlorethane.

8 Claims, No Drawings

THERMOSTABLE POLYESTER

CROSS-REFERENCE TO RELATED APPLICATIONS

This is a continuation-in-part of copending application Ser. No. 244,239 filed Apr. 14, 1972, which, in turn, is a continuation of Ser. No. 33,968 of May 1, 1970, both now abandoned.

BACKGROUND OF THE INVENTION

1. Field of the Invention

This invention relates to the preparation of novel thermostable polyesters derived from dihydroxytetraphenylmethane. More particularly, this invention relates to the preparation of such novel thermostable polyesters from dihydroxytetraphenylmethane and a source of an isophthalyl or terephthalyl moiety wherein the polymerization process is conducted in the absence of a catalyst. This invention is also directed to the preparation of highly stable thermopolyesters which can be formed into sheets having good physical properties, especially tensile strength.

2. Discussion of the Prior Art

It has long been known to prepare polyesters by a condensation of a dihydric alcohol and a source of a carboxylic acid. For instance, polyesters are prepared in the condensation of ethylene glycol with a terephthalic acid ester. Generally speaking, a molar excess of dihydric alcohol is employed, and the materials are reacted in a first or precondensation stage to prepare prepolymer which is thereafter reacted in a polycondensation stage to prepare the final polyester. Numerous different carboxylic acids and dihydric alcohols have been proposed as precursors for polyesters.

It has become desirable to provide thermostable polyesters which can be formed into sheets, films, coatings and the like which possess excellent electrical insulating properties. More particularly, it has become desirable to provide a simple and efficient process for the preparation of such polyesters, which process can be conducted without the use of a polycondensation catalyst. Generally speaking, the prior art has advocated the use of polycondensation catalysts in the preparation of polyesters, especially where it is desired to obtain a polyester which is insoluble in certain chlorinated hydrocarbon solvents, e.g. tetrachloroethane.

SUMMARY OF THE INVENTION

In accordance with the present invention, there is provided a process for the production of a thermostable polyester insoluble in tetrachloroethane based on dihydroxytetraphenylmethane in ad mixture with 2,2-bis-(4-hydroxyphenyl)propane as the dihydric alcohol component, which process can be performed in the absence of a catalyst. More particularly, it has been discovered that thermostable polyesters insoluble in tetrachlorethane consisting of about 40 to 200 units, of which some units have the formula

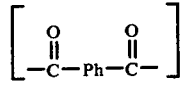

and others have the formula

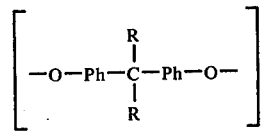

wherein Ph is

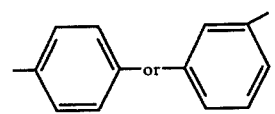

and both R radicals are methyl on some units and both R radicals are phenyl on the balance of the units, said methyl units comprising 5 to 30 mole percent of the total R-containing units, can be prepared by heating and condensing 4,4'-dihydroxytetraphenylmethane having a melting point of at least 295° C, in admixture with 2,2-bis-(4-hydroxyphenyl)-propane with terephthalic or isophthalic acid dichloride. The process is carried out in the absence of a catalyst until there is prepared a polyester which is insoluble in tetrachlorethane.

The method by which the thermostable tetrachloroethane insoluble polyester is prepared does not differ significantly from the manipulative procedures heretofore employed generally for the preparation of polyesters. However, it has been discovered that a polycondensation catalyst need not be employed to obtain a polyester of the type described insoluble in tetrachloroethane if the dihydroxytetraphenylmethane reactant is of such a purity that its melting point is at least 295° C.

The polyesters prepared are characterized particularly by their insolubility in tetrachloroethane, by intrinsic viscosities in ortho-dichlorobenzene of 0.8 to 1.4, preferably 1 to 1.2 dl/g of vicat softening points, in accordance with DIN 53,460 in air under 5 kp of 230° to 270° C, preferably 250° to 260° C, and by an oxygen-absorbing capacity of no more than 0.3 mg/g/h, preferably 0.1 to 0.2 mg/g/h, at 250° C.

The thermostable polyesters prepared by the process of the present invention have between 40 and 200 recurring units, preferably from 80 to 150 recurring units. There are between 5 and 30 mole percent repeating units wherein R is in both instances methyl. The balance of the R groups in such polymer is phenyl.

The polyester is made from a compound containing a carbonyl group. Suitably, an isopthalyl or terephthalyl supplying moiety is employed. Generally speking, isophthalyl and terephthalyl halides can be employed as the acid component. During the reaction, the acid supplying moieties react with the dihydroxytetraphenylmethane and the 2,2-bis-(4-hydroxyphenyl)-propane to such an extent that there is prepared a thermostable polyester insoluble in tetrachlorethane. While the process parameters employed, including mole ratios, are not any different from those heretofore utilized in the synthesis of polyesters, the molar ratio of dihydroxytetraphenylmethane and 2,2-bis-(4-hydroxyphenyl)-propane to isophthalyl or terephthalyl halides is preferably 1 : 1. The preparation of these polyesters is performed by reaction of terephthalic or isophthalic acid dichloride with a mixture of 4,4'dihydroxytetraphenylmethan and 2,2-bis-(4-hydroxyphenyl)-propane, preferably in organic solvents, with the yielding of HCl. The condensation reaction is carried out at temperatures between 100° and 250° C. The reactants are heated at such temperature until the polyester insoluble in tetrachlorethane is prepared. Generally speaking, this polymer is realized after heating at such temperatures for between 10 and ca. 100 hours.

The polyester synthesis is generally conducted in an inert atmosphere, e.g. in an atmosphere of an inert gas, particularly nitrogen. Suitably, the reaction can take place in a pressure vessel such as an autoclave.

The resultant polyester is characterized by improved thermal stability. For instance, it does not appreciably lose tensile strength after it has been heated at 200° C. Thus, it was found that the tensile strength determined on one sample of polyester at 200° C still amounted to approximately 36% of the strength determined at room temperature.

Preferred polyesters prepared by the process of the invention are those in which the carbonyl and carboxy groups of the phenylene moiety that is derived from an aromatic dicarboxylic acid are in the p position in relationship to one another, particularly polyesters derived from terephthalic acid.

The preparation of polyesters in accordance with the invention is characterized in that the 4,4'-dihydroxytetraphenylmethane component has a stated purity. That purity is such that the material has a melting point of at least 295° C and preferably higher than 300° C. It is by use of such a pure component that the process can be carried out in the absence of a catalyst, and yet there is obtained a polyester insoluble in tetrachloroethane. Such is particularly surprising in view of the fact that related dihydric alcohols when condensed with terephthalic and/or isophthalic containing moieties provide polymers which are generally soluble in chlorinated hydrocarbons. (See U.S. Pat. No. 3,133,898, column 3, lines 50–64). The dihydroxytetraphenylmethane is in admixture with 2,2-bis(4-hydroxyphenyl)-propane. Preferably, the molar ratio of 4,4'-digydroxytetraphenylmethane to 2,2-bis-(4-hydroxyphenyl)-propane is between 0,95 : 0,05 and 0,7 : 0,3.

Preferably, the 2,2-bis-(4-hydroxyphenyl)-propane component is of the highest possible purity.

The diphenol mixture used for the preparation of the polyesters contains the 4,4'-dihydroxytetraphenylmethane and 2,2-bis-(4-hydroxyphenyl)-propane in a weight ratio of 19:1 to 7:3, preferably 9:1 to 8:2. If desired, the polycondensation process can be carried out in a solvent. The resultant products are characterized by particular stability against oxidation and thermal decomposition.

The thermostable polyesters prepared by the process are particularly useful in the manufacture of electrical insulating sheets, films, coatings and impregnations.

In order to more fully illustrate the nature of the invention and the manner of practicing the same, the following examples are presented:

EXAMPLE 1 a. Preparation of the 4,4'-dihydroxytetraphenylmethane 188 g of 100% phenol (2 moles) and 237 g of pure dichlorodiphenylmethane (1mole) were mixed together by stirring in a nitrogen atmosphere at 30° C, the temperature being kept constant until complete dissolution had occurred. Then the flask with stirrer, in which the reaction had been performed, was heated on an oil bath to 150° C, and when the principal reaction had ceased an oil-pump vacuum was applied. Within 20 minutes the mixture had completely hardened. Heating was continued for about half an hour under vacuum, and then 3 liters of ethanol was poured hot into the flask. After cooling, the crystalline mass was suction filtered and thoroughly washed with cold water. Then it was extracted with cold ethanol until the eluate was colorless. The product then had a melting point of 298°–300° C, and after a single recrystallization from ethanol its melting point was 301°–303° C, which increased to 303°–305° C after two recrystallizations, at which time the product was pure white.

Yield: 266 g. An additional 72 g was obtained by processing the ethanol, so that the total yield was 338 g or 96%.

b. Preparation of the Thermostable Polyester

In a three-necked flask provided with stirrer, condenser and gas introduction tube, 28.2 g (0.08 mole) of the 4,4'-dihydroxytetraphenylmethane thus produced, 4.6 g (0.02 mole) of 2,2-bis-(4-hydroxyphenyl)-propane and 20.3 g of terephthalic acid dichloride (0.1 mole) was dissolved in 337 ml of o-dichlorobenzene. The solution was heated to the boiling temperature with strong agitation and the introduction of dry nitrogen, and was maintained at this temperature for 72 hours. At the same time the hydrogen chloride that formed was continuously displaced from the reaction chamber by a stream of nitrogen and was captured in an absorption vessel and titrated. In this manner a check could be kept on the progress of the reaction.

1.5 l of methanol was added to half of the polyester solution and in this manner the polyester was precipitated. After filtration the product was again suspended in pure methanol and further purified by boiling the resultant suspension. After repeated filtration the end product was dried at 100° C and 10 Torr.

The white product had the following characteristics:

Melting range, determined in the melting block:
 360 to 370° C
Density: 1.23 g/cm³
Intrinsic viscosity (0.5 wt.% solutions in o-dichlorobenzene at 20° C): 1.2 (taking as the basis the viscosity number according to DIN 53,726).
Behavior on the thermoscale in air:
1 wt-% 400 – 450° C
5 wt-% 450 – 500° C
Oxygen absorption
at 250° C 0.2 mg/g/h The other half of the polyester solution was put into a spreader and poured onto a glass plate. After it had dried it produced a sheet which was heated in a vacuum drying cabinet after 10 hours to 180° C. The sheet that finally resulted was transparent and colorless and about 0.1 mm thick. The physical properties of the material are listed in Tables 1 and 2, and in Table 2 they are compared with the properties of conventional materials.

TABLE 1

|  | Tensile strength (Kp/cm²) | Elongation at Rupture (%) |
|---|---|---|
| 20° C | 815 | 8 |
| 50° C | 800 | 9 |

TABLE 1-continued

| | Tensile strength (Kp/cm²) | Elongation at Rupture (%) |
|---|---|---|
| 100° C | 525 | 9 |
| 150° C | 405 | 26 |
| 200° C | 290 | 31 |
| Modulus of elasticity: | 32000 kp/cm² | |
| Vicat temperature in air: | Above 250° C | |

TABLE 2

| Polyester Type | Softening Temp. (determined by torsional vibration test per DIN 53.445 | Dielectric loss factor tan o at 1 MHz and 20° C | Dielectric constant E at 1 MHz and 20° C | Spec. mass resistance at 20° C | Breakdown strength at 20° C in kV/mm | Weight loss after 1 day at elevated temperature ° C    wt-% | | No flammable gases at ° C |
|---|---|---|---|---|---|---|---|---|
| According to the Invention | 280° C | 110.10⁻⁴ | 3.3 | 10¹⁶ | 200 | 250 | 0.1 | 400 |
| Polyethyene terephthalate | 80° C | 200.10⁻⁴ | 3.1 | 10¹⁷ | 300 | 130 | 0.15 | 400 |
| Polycarbonate | 149° C | 90.10⁻⁴ | 2.7 | 10¹⁷ | 240 | 120 | 1.0 | 400 |

EXAMPLE 2

Employing less pure dihydric alcohol

In the manner of Example 1b) above, 28.2 g (0.08 mole) of 4,4'-dihydroxytetraphenylmethane of melting point of 286° C and 4.6 g (0.02 mole) of 2,2-bis-(4-hydroxyphenyl)-propane of a degree of purity suitable for the production of polycarbonates and 23.3 g (0.1 mole) of terephthalic acid dichloride were dissolved in 337 ml of ortho-dichlorobenzene. The reaction mixture in the ortho-dichlorobenzene solvent was condensed in accordance with Example 1b, supra. There was prepared a dry condensate which had the following characteristics:

Density: 1.21 g/cm³
Melting range: 350–370° C
Intrinsic viscosity (0.5% by weight solution in o-dichlorobenzene at 20° C): 0.22 (based on the viscosity number thermoscale in air)
The results below report such findings:
1% by weight        386° C
5% by weight        401° C
Oxygen absorption
at 250° C           0.8 mg/g/h The polyester so prepared was compared with the polyester of Example 1b. It was attempted to continuously cast a sheet of such polyester derived from 4,4'-dihydroxytetraphenylmethane of melting point 286° C. It was found that a continuous sheet could not be cast by the method of Example 1b, supra, employing the polyester prepared from such dihydric alcohol.

On the other hand, the polyester prepared by Example 1b, supra, utilizing 4,4'-dihydroxytetraphenylmethane of melting point 298°–300° C could be spread and poured onto a place from which it could be cast as a continuous sheet. The sheet was transparent and colorless. It had a thickness of 0.1 mm.

What is claimed is:

1. A process for the preparation of a thermostable polyester having an intrinsic viscosity of 0.8 to 1.4 determined in a 0.5% by weight solution in o-dichlorobenzene at 20° C which polymer is insoluble in tetrachloroethane and consists of about 40 to 200 units, said polymer having units of the formula

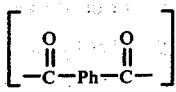

combined with units of the formula

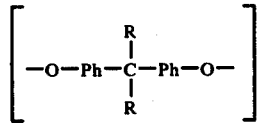

wherein Ph is

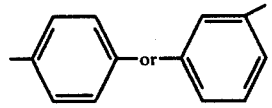

and both R radicals are methyl on some units and both R radicals are phenyl on the balance of the units, said methyl units comprising 5 to 30 mol percent of the total R-containing units which comprises heating and condensing in the absence of a catalyst a mixture of 2,2-bis-(4-hydroxyphenyl)-propane and 4,4'-dihydroxytetraphenyl-methane having a melting point of at least 300° C together with a compound supplying an isophthalyl or terephthalyl moiety until there is prepared said polyester which is insoluble in tetrachloroethane.

2. In a process for the preparation of a thermostable polyester having an intrinsic viscosity of 0.8 to 1.4 determined on a 0.5% by weight solution in o-dichlorobenzene at 20° C which polymer is insoluble in tetrachloroethane by heating and condensing a compound which supplies an isophthalyl or terephthalyl moiety and a dihydric alcohol, the improvement which comprises employing as such dihydric alcohol a mixture of 2,2-bis-(4-hydroxyphenyl)-propane and 4,4'-dihydroxytetraphenylmethane which has a melting point of at least 300° C and heating and condensing said 4,4'-dihydroxytetraphenylmethane and the compound that supplies the isophthalyl or terephthalyl moiety until there is prepared a polyester which is insoluble in tetrachloroethane.

3. A process according to claim 1 wherein the 4,4'-dihydroxytetraphenylmethane and 2,2-bis-(4-hydroxyphenyl)-propane are in a weight ratio of 19:1 to 7:3.

4. A process according to claim 3 wherein the 4,4'-dihydroxytetraphenylmethane and 2,2-bis-(4-hydroxyphenyl)propane are in a weight ratio of 9:1 to 8:2.

5. A process according to claim 3 wherein the compound supplying the isophthalyl or terephthalyl moiety is terephthalic acid dichloride.

6. A process according to claim 3 wherein the condensation is carried out in the presence of a solvent.

7. A process according to claim 6 wherein the solvent is ortho-dichlorobenzene.

8. The thermostable polyester prepared by the process of claim 1.

* * * * *